United States Patent
Saunders et al.

(10) Patent No.: US 7,643,813 B2
(45) Date of Patent: Jan. 5, 2010

(54) DIVERSITY SWITCH COMBINER

(75) Inventors: Simon R. Saunders, West Sussex (GB); Stephen Michael Leach, West Sussex (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 615 days.

(21) Appl. No.: 10/985,011

(22) Filed: Nov. 10, 2004

(65) Prior Publication Data

US 2005/0107048 A1   May 19, 2005

(30) Foreign Application Priority Data

Nov. 18, 2003   (EP)   ................................. 03257284

(51) Int. Cl.
    *H04B 1/06*   (2006.01)
(52) U.S. Cl. ................. 455/277.2; 455/137; 455/154.1; 375/347
(58) Field of Classification Search ......... 455/132–141, 455/272–275, 276.1, 277.1, 277.2, 69, 101–103, 455/150.1, 154.1, 278.1; 375/267, 132, 136, 375/347

See application file for complete search history.

(56) References Cited

U.S. PATENT DOCUMENTS

| | | | |
|---|---|---|---|
| 6,009,307 A | 12/1999 | Granata et al. | |
| 6,067,449 A * | 5/2000 | Jager | 455/277.2 |
| 6,263,195 B1 | 7/2001 | Niu et al. | |
| 6,574,460 B1 | 6/2003 | Lindenmeier et al. | |
| 6,728,517 B2 | 4/2004 | Sugar et al. | |
| 6,738,439 B1 | 5/2004 | Okanoue et al. | |
| 6,922,549 B2 * | 7/2005 | Lyons et al. | 455/67.13 |
| 7,065,146 B1 * | 6/2006 | Lou et al. | 375/262 |
| 7,072,628 B2 * | 7/2006 | Agashe et al. | 455/140 |
| 7,142,824 B2 * | 11/2006 | Kojima et al. | 455/78 |
| 2002/0004375 A1 | 1/2002 | Spencer et al. | |
| 2002/0122499 A1 * | 9/2002 | Kannan et al. | 375/260 |
| 2002/0151301 A1 | 10/2002 | Miyoshi | |
| 2002/0186797 A1 * | 12/2002 | Robinson | 375/341 |
| 2003/0002471 A1 | 1/2003 | Crawford et al. | |
| 2003/0090993 A1 * | 5/2003 | Sato | 370/203 |
| 2003/0125078 A1 | 7/2003 | Hong | |
| 2004/0198420 A1 * | 10/2004 | He et al. | 455/552.1 |
| 2004/0198452 A1 | 10/2004 | Roy | |
| 2004/0219959 A1 | 11/2004 | Khayrallah et al. | |
| 2004/0266375 A1 * | 12/2004 | Li et al. | 455/140 |
| 2005/0107048 A1 | 5/2005 | Saunders et al. | |
| 2006/0009176 A1 * | 1/2006 | Saunders et al. | 455/137 |
| 2006/0014497 A1 | 1/2006 | Doi et al. | |

FOREIGN PATENT DOCUMENTS

| | | |
|---|---|---|
| EP | 1294154 A2 | 3/2003 |
| EP | 1296466 A2 | 3/2003 |
| FR | 2 833 435 A1 | 6/2003 |
| WO | WO-03/073682 A1 | 9/2003 |

* cited by examiner

*Primary Examiner*—Nhan T Le
(74) *Attorney, Agent, or Firm*—Birch, Stewart, Kolasch & Birch, LLP.

(57) ABSTRACT

A diversity switch combiner for use in systems for receiving multi-carrier wideband signals is arranged to determine, during a guard interval, which antenna provides the strongest carrier, for each of a plurality of carrier frequencies. A switch is then operated to select, for the subsequent symbol, that antenna which provides the greatest number of strongest carriers.

12 Claims, 2 Drawing Sheets

DIVERSITY SWITCH COMBINER

BACKGROUND OF THE INVENTION

1. Field of the Invention

This invention relates to antenna diversity receivers, particularly those suitable for use for wideband radio reception and more particularly for multi-carrier systems.

2. Description of the Prior Art

Antenna diversity receivers use multiple antennas to overcome signal quality degradation caused by multipath fading. If the antennas are arranged such that their outputs fade independently, then the signals from the antennas can be combined to produce a signal with higher quality since it is unlikely that both antennas (branches) will simultaneously be in a deep fade. This allows the receiver to be used in areas with lower signal strengths or to provide higher signal quality and reliability within the normal system coverage area.

A common form of diversity combiner is a switch combiner, in which only one complete receiver is needed. The receiver is switched between the antennas and makes a judgment as to which antenna provides the strongest signal. Numerous schemes for doing this exist, but it is believed that none of them address suitable strategies for wideband channels. In all cases, switch combining performs less well than selection combining, in which two receivers are available so that the performance of both antennas can be simultaneously monitored, but a switch is used to select the signal from only one of them at a time. Maximal ratio combining (MRC) involves using, simultaneously, a plurality of receivers each operating on a signal from a respective antenna, and using signal processing to combine the outputs of the receivers. This gives better performance than either switch combining or selection combining, but is somewhat more expensive.

In a wideband fading channel, the bandwidth of the transmitted signal is wider than the coherence bandwidth of the channel (see S. R. Saunders, "Antennas and Propagation for Wireless Communication Systems", John Wiley & Sons, ISBN 0471986097, July 1999, for precise definitions). This implies that different parts of the received signal bandwidth will be faded to different extents, so the choice of the best antenna is not clear. A conventional switch combiner could make a decision based on the total power available over the whole signal bandwidth, by performing a vector sum of the respective channel outputs of the receiver filter. FIG. 1 shows (curve A) that this yields only minor diversity gain when the delay spread is large, i.e. when there are significant delayed versions of the signal arriving at the receiver due to multipath echoes. The simulations in this figure assume two identical vertical antennas, with a mobile speed of 20 km/hr. The system simulated represents the ITU-T ISDB-T digital broadcasting standard. Diversity gain is referenced to the power required to achieve a bit error rate of $2 \times 10^{-4}$. Curve B shows that the results when selection combining is used instead of switch combining are not significantly better.

Choosing a single antenna, based on whichever criteria, and using this for the reception of the whole ISDB-T bandwidth can lead to significant degradation in performance. Mostly, this will be due to the fact that somewhere within the signal bandwidth there will be a deep null, so although at some carriers within the bandwidth there may be excellent diversity gain, there is none achieved at other carriers, with the resultant diversity gain essentially an average across the bandwidth.

Given that delay spread has been shown to produce this significant performance degradation, it would be attractive to have a combining technique which avoids this problem, but without the expense of MRC systems, and preferably using only one receiver.

Accordingly, it would be desirable to provide a switch diversity combiner which has improved performance in high delay-spread environments.

SUMMARY OF THE INVENTION

Aspects of the present invention are set out in the accompanying claims.

According to a further aspect of the invention, the received channel state is estimated at several frequencies across the signal bandwidth, with the number of estimation frequencies being sufficient to adequately represent the variations in the channel state. The channel may be estimated according to a number of conventional approaches. One example is that in the ISDB-T standard there are known symbols, known as scattered pilots, transmitted at various times and at various frequencies. The receiver compares the expected symbols to the data received and estimates the channel by comparison.

Once the channel has been estimated at all of the chosen frequencies for one antenna, the results are stored, the switch is changed to the other antenna and the process is repeated. The channel values at each of the sample frequencies are compared to those for the first antenna, and the antenna for which the biggest number of samples are larger than those from the other antenna is selected for subsequent reception.

The time taken to monitor the two antennas ready for the decision should be as small as possible, and the subsequent reception period should be small compared with the channel coherence time for best results.

If desired, selection combining could be used instead of switch combining, so that the quality estimates for the respective antennas can be obtained simultaneously; however, it is currently felt that it is unlikely the performance improvement would justify the extra expense of this approach.

The invention is particularly applicable to multi-carrier signals which are transmitted in the form of symbols comprising a guard period followed by a useful part of the symbol, the guard period corresponding to the end of the useful part. In this case, the quality estimation is preferably performed during the guard period, so that the antenna switching can be carried out without causing a significant deterioration of performance.

The combiner is preferably located between the antennas and the receiver, and thus conveys RF signals to the receiver. Alternatively, the combiner could be located within the receiver, e.g. in the IF section, although in this case separate versions of the circuits prior to the combiner would have to be provided.

BRIEF DESCRIPTION OF THE DRAWINGS

An arrangement embodying the invention will now be described by way of example with reference to the accompanying drawings, in which.

DETAILED DESCRIPTION OF THE PREFERRED EMBODIMENTS

Figure 2:
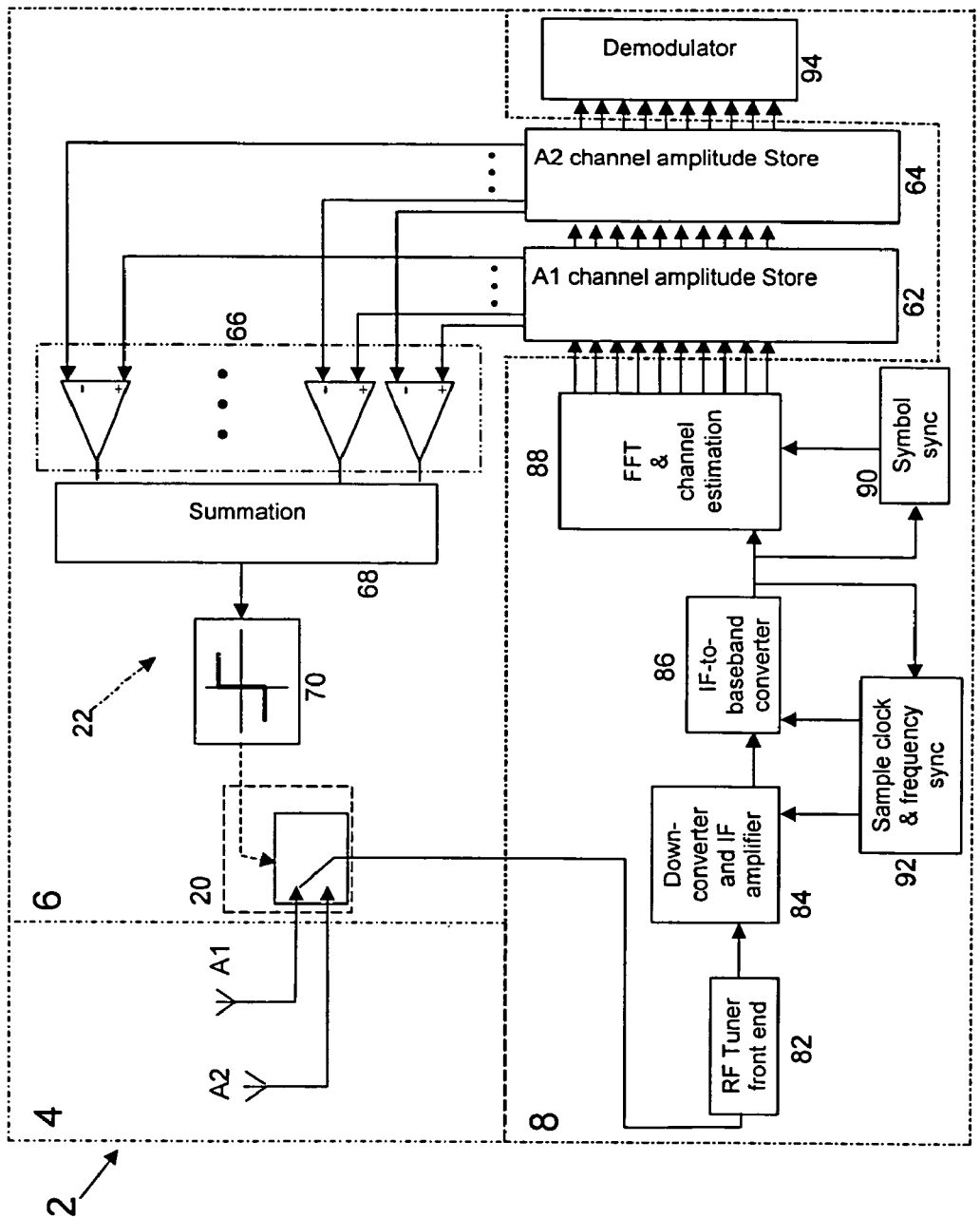
FIG. 2 schematically illustrates a receiver system according to an embodiment of the invention.

In FIG. 2, an embodiment of the invention is shown. The receiver system 2, which is intended for receiving OFDM (Orthogonal Frequency Division Multiplex) signals, particularly ISDB-T signals, includes an antenna section 4, a switch combining section 6 (including a switch 20 and a switch control means 22) and a receiver circuit 8 which includes means for converting the received signal to baseband.

In the antenna section 2, two antennas, A1 and A2, are arranged so that their outputs fade substantially independently. The outputs are coupled to a switch 20 of the switch combining section 6. The switch 20 is operable to couple each output to the receiver circuit 8.

The receiver circuit 8 shown in FIG. 2 is of conventional structure, and includes an RF tuner front end 82, which receives the signals from the antennas via the switch 20. The output of the front end is delivered to a down converter and IF amplifier 84, which supplies its output to an IF-to-baseband converter 86. The baseband signals from the converter 86 are sent to an FFT and channel estimation block 88, which generates the OFDM carrier signals. These are demodulated by a demodulator 94. The baseband signals are also delivered to a symbol synchronisation circuit 90, for synchronising the operation of the FFT and channel estimation block 88, and to a sample clock and frequency synchronisation circuit 92 which synchronises the operations of the down converter and IF amplifier 84 and the IF-to-baseband converter 86.

This is merely one example of a number of different types of receiver circuits which could be employed in the system of FIG. 2. In alternative arrangements, the switch 20 could instead be provided within the receiver circuit 8, for example between the down converter and IF amplifier 84 and the IF-to-baseband converter 86, if the circuits preceding the converter 86 are duplicated.

The baseband signals derived by the receiver circuit 8 represent channel amplitudes for each carrier within the signal bandwidth. These signals are continuously fed to the conventional demodulator circuit 94.

The RF input to the receiver circuit 20 is fed by the electronically controlled switch 20 which selects one of the two antennas (A1 or A2) depending on the value of a control voltage produced by the switch control means 22. During the symbol guard interval, antenna A1 is initially selected, and the carrier amplitudes derived by the FF1 and channel estimation block 88 are stored in a first memory 62 of the switch control means 22. The switch state is then changed to select antenna A2 and the carrier amplitudes are stored in a further memory 64 of the switch control means 22. A bank 66 of comparators compares the amplitudes of corresponding carriers for the two branches, yielding a positive output voltage if a carrier from antenna A1 is of a higher amplitude than the same carrier from antenna A2, and yielding a negative output voltage otherwise. The output voltages from all the comparators are summed by a summing circuit 68, yielding a positive output voltage if the majority of the comparators indicate that the antenna A1 amplitudes exceed those from antenna A2, and a negative output voltage otherwise. A threshold circuit 70 produces a fixed positive output voltage for any positive input, and a fixed negative output for any negative input. These voltages match the control voltages necessary to place the switch 20 in either the antenna A1 or antenna A2 state respectively. This state is held for the duration of a transmitted symbol, following which another guard interval occurs and the whole process is repeated.

This arrangement uses signal strength for estimating the quality of the respective channels. There are various other known ways of estimating signal quality. For example, the distances of the carrier outputs from the correct positions for the carrier constellation can be measured. It is not necessary to use all the carriers for quality estimation, although the carriers which are used should be spread throughout the frequency spectrum of the signal. It is possible to base the quality estimation on pilot carriers, by comparing their actual values with the known values they should adopt in a clean, noise-free system. Alternatively, spectrum estimation based on a limited number of samples could be used.

The decision steps implemented by the voting and switching logic of the switch combining section 6 are as follows:

During each guard interval:
Switch to antenna A1
Store quality estimates (e.g. amplitudes) of carriers for antenna A1
Switch to antenna A2
Store quality estimates (e.g. amplitudes) of carriers for antenna A2
Compare stored values
Select branch with biggest number of wins
Subsequently:
Hold switch state for remainder of guard interval and sample duration.

If the quality estimation takes longer than the duration of the guard interval, the switching could nevertheless occur during the useful part of the signal. Alternatively, if the quality estimation takes too long to be considered of value for the current symbol, the switch state could instead be set for the useful part of the next symbol (after first altering the state during the next guard interval for obtaining further quality estimates). It is not necessary to repeat the process regularly. Instead the process could be triggered by a detected deterioration in quality.

The above embodiment could be modified by having one or more further receiver circuits 8 to provide a selection combining arrangement, so that channel estimation for the respective antennas can be carried out simultaneously.

Figure 1:
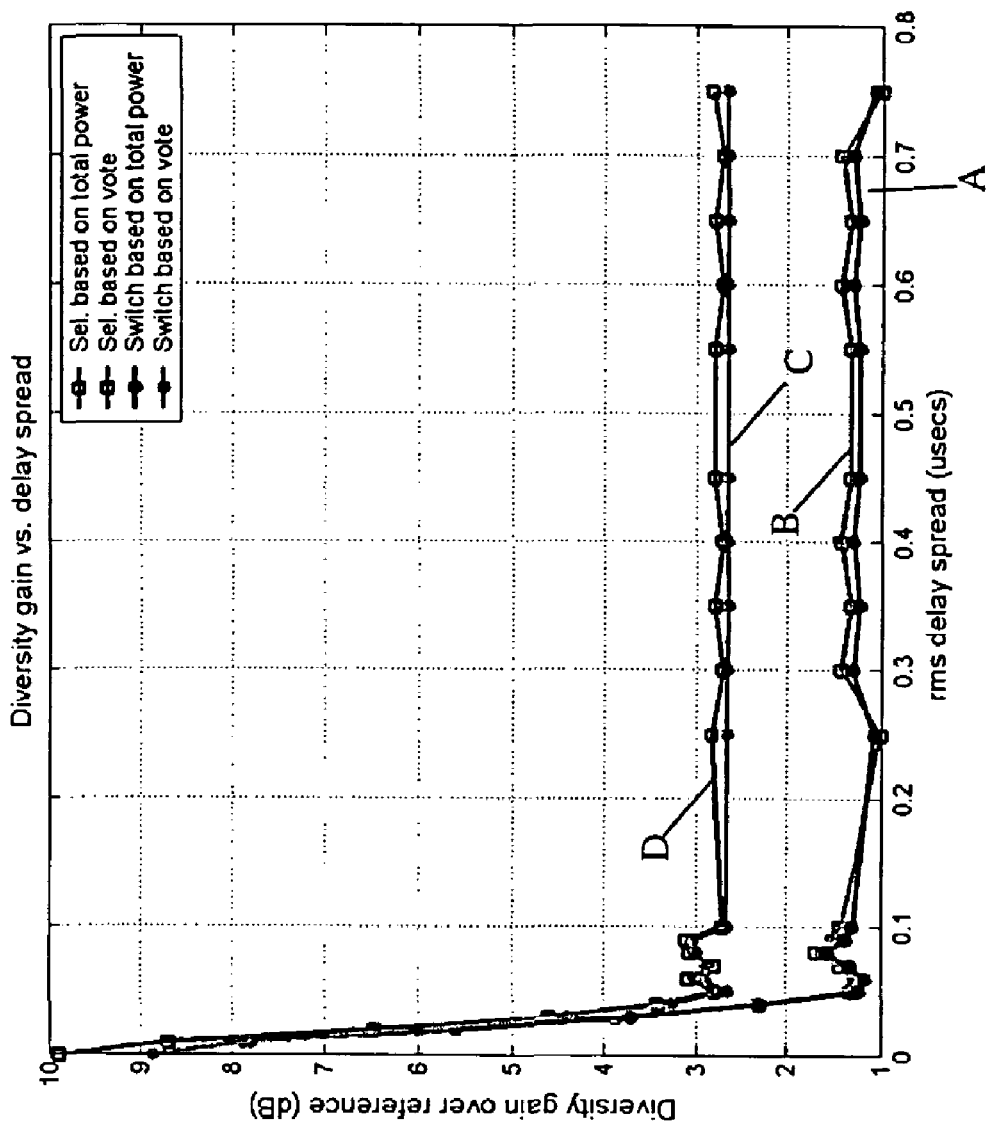
FIG. 1 is a graph illustrating diversity gain at different delay spreads for various switch and selection combiner arrangements.

Curve C in FIG. 1 shows the diversity gain performance for the switch combining arrangement, which is significantly larger than the conventional switch combiner, and is almost identical to that of a selection combining arrangement (curve D) operating using the voting technique described above.

The approach can easily be generalised to more than two branches by switching to each branch in turn, storing the sample values, and comparing all the stored values after checking all branches. The branch which has the greatest number of samples with the largest signal strength will be selected.

In order to resolve tied votes, where multiple branches have the same number of 'wins', the most recently examined branch should be selected since the channel will have changed least between this evaluation and the subsequent reception period.

In a more sophisticated approach, each branch may be awarded a score for each sample frequency, which score increases with the signal quality (e.g. strength) estimated at that sample frequency, and decreases with the elapsed time between the sampling instant and the reception period. For example, if antenna A1 measurements are made before antenna A2 measurements, the antenna A1 quality estimates can be weighted to make them of apparently lower quality. The branch with the highest score is deemed to have won the vote for that sample frequency. Again, the branch with the greatest number of votes is selected.

It is envisaged that the receiver circuit which is used to generate the main receiver output is also used for obtaining the measurements for the quality estimates, but this is not essential.

The diversity system proposed is applicable to any wideband radio system, using any number of antennas. It is particularly relevant to applications at user terminals where power consumption, size and cost are particularly critical, whereas base stations will usually implement diversity combiners which use one receiver circuit per branch.

Particular systems which are applicable are:
ISDB-T
DAB
DVB
UMTS
cdma2000

The invention claimed is:

1. A diversity combiner for a receiver system for receiving signals in the form of successive symbols including guard periods, the diversity combiner comprising:
   a plurality of antennas;
   a receiver circuit for converting multi-carrier wideband signals from the antennas into baseband signals provided at a baseband output;
   switch means for selectively coupling the antennas to the receiver circuit; and
   switch control means which is operable to estimate, for each of a plurality of carriers, that antenna which produces the best signal quality, and to control the setting of the switch means in dependence upon which antenna produces the best signal quality for the greatest number of carriers,
   wherein the switch control means is arranged to alter the switch settings during a guard period in order to determine the relative strengths of the signals.

2. A combiner as claimed in claim 1, for use in a receiver system for receiving signals in which selected carriers are pilots having predetermined values, and in which said plurality of carriers comprises the pilots.

3. A combiner as claimed in claim 2, in which the quality is estimated according to the difference between each pilot measurement and a known value for the pilot.

4. A combiner as claimed in claim 1 or claim 2, in which the quality is estimated according to carrier amplitude.

5. A combiner as claimed in claim 1, in which a common circuit means is operable to enable successive sets of measurements to be taken from the antennas, each set enabling quality estimates to be made for a respective antenna.

6. A combiner as claimed in claim 5, wherein the common circuit is said receiver circuit.

7. A combiner as claimed in claim 5, wherein the switch control means is operable to weight the quality estimates to favour those which are based on more recent measurements.

8. A combiner as claimed in claim 1, wherein the switch control means is operable to determine the relative signal strengths during each guard period so as to control the switch setting for the current symbol.

9. A combiner as claimed in claim 1, wherein the switch means is arranged to provide RF signals.

10. A combiner as claimed in claim 1, wherein the switch means is arranged to provide IF signals.

11. A receiver system comprising a plurality of antennas, a receiver circuit for converting signals received from the antennas into baseband signals, and a diversity switch combiner as claimed in claim 1.

12. A method of operating a wideband receiver having at least two antennas, the method comprising:
   receiving signals in the form of successive symbols including guard periods;
   selectively coupling the antennas to a receiver circuit, wherein switching which of the antennas is coupled to the receiver circuit occurs during a guard period;
   for each of a plurality of carrier frequencies contained in a received signal, comparing the signal qualities from the respective antennas to determine which antenna provides the best quality;
   selecting that antenna which provides the largest number of carrier frequencies of greatest quality; and
   demodulating the signal received via the selected antenna.

* * * * *